US008693533B2

(12) United States Patent
Ancora et al.

(10) Patent No.: US 8,693,533 B2
(45) Date of Patent: Apr. 8, 2014

(54) LOW COMPLEXITY MMSE EQUALIZATION PROCESS AND EQUALIZER FOR DOING THE SAME

(75) Inventors: Andrea Ancora, Nice (FR); Giuseppe Montalbano, Villeneuve Loubet (FR)

(73) Assignee: ST-Ericsson SA, Plan-les-Ouates (CH)

( * ) Notice: Subject to any disclaimer, the term of this patent is extended or adjusted under 35 U.S.C. 154(b) by 21 days.

(21) Appl. No.: 13/635,865

(22) PCT Filed: Mar. 18, 2011

(86) PCT No.: PCT/EP2011/001361
§ 371 (c)(1),
(2), (4) Date: Sep. 28, 2012

(87) PCT Pub. No.: WO2011/113609
PCT Pub. Date: Sep. 22, 2011

(65) Prior Publication Data
US 2013/0188681 A1     Jul. 25, 2013

(30) Foreign Application Priority Data
Mar. 19, 2010 (EP) .................................. 10368018

(51) Int. Cl.
*H03H 7/30* (2006.01)
(52) U.S. Cl.
USPC ........................................................ 375/232
(58) Field of Classification Search
USPC ......... 375/232, 267, 295, 316, 319, 340, 341, 375/346, 347, 350
See application file for complete search history.

(56) References Cited

U.S. PATENT DOCUMENTS

2004/0242179 A1* 12/2004 Onggosanusi et al. ....... 455/296
2009/0219981 A1*  9/2009 Wang et al. .................... 375/230

OTHER PUBLICATIONS

Ancora A. et al.; "Performance Analysis of Preconditioned Iterative Inter-Carrier Interference Cancellation for OFDM", IEEE International Conference on Communications—2010 IEEE International Conference on Communications, ICC 2010, 2010 Institute of Electrical and Electronics Engineers Inc., USA May 23-27, 2010.
Ancora, A. et al.; "Preconditioned Iterative Inter-Carrier Interference Cancellation for OFDM Reception in Rapidly Varying Channels", Proceedings of IEEE International Conference on Acoustics, Speech, and Signal Processing (ICASSP), Mar. 14-19, 2010, Dallas, TX; pp. 3066-3069.
Chao-Yuan, Hsu et al.; "Low-Complexity ICI Mitigation Methods for High-Mobility SISO/MIMO-OFDM Systems", IEEE Transactions on Vehicular Technology, IEEE Service Center, Piscataway, NJ, vol. 58, No. 6, Jul. 1, 2009; pp. 2755-2768.

* cited by examiner

*Primary Examiner* — Jaison Joseph
*Assistant Examiner* — Syed Haider
(74) *Attorney, Agent, or Firm* — Coats and Bennett PLLC (57) ABSTRACT

Process for equalizing a signal received in a receiver of a Terminal Equipment in a wireless communication system, said process comprises the steps of:—receiving a signal r—applying an iterative algorithm based on a sequence of varying preconditionners in accordance with the following formula: based on a sequence of preconditioning matrices $P_j$, each matrix depending on H, the variance of the noise, and the precedent matrices $P_j$ within said sequence.

15 Claims, 4 Drawing Sheets

INPUT: $H$, $\sigma_z^2$, $\{S_1, \cdots, S_N\}$, $r$, K
OUTPUT: $\hat{s}_K$
$R = H^H H$
Pre-conditioning initialization
for $n = 1$ to N do
$$[P_0]_{i=n;j=1,\ldots,N} = 1_n H^H S_n^H \left[ S_n \left( \sigma_s^2 H H^H + \sigma_z^2 I \right) S_n^H \right]^{-1} S_n$$
end for
Estimate initialization
$\hat{s}_0 = P_0 r$
$z_0 = \hat{s}_0$
$\widetilde{T}_0 = (I - P_0 H)$
Main loop
for $k = 1$ to K do
  # Pre-conditioning update
  for $n = 1$ to N do
$$[P_K]_{i=n;j=1,\ldots,N} =$$
$$1_n \left( \sigma_s^2 \widetilde{T}_{K-1} + \sigma_z^2 (\widetilde{T}_{K-1} - I) R^{-1} \right) \cdot$$
$$\cdot \widetilde{T}_{K-1}^H H^H S_n^H \cdot \left[ S_n \left( H \widetilde{T}_{K-1} \left( \sigma_s^2 I + \sigma_z^2 R^{-1} \right) \widetilde{T}_{K-1}^H H^H \right) S_n^H \right]^{-1} S_n$$
  end for
  # Estimate update
  $z_k = (I - P_k H) z_{K-1}$
  $\hat{s}_k = \hat{s}_{k-1} + z_k$
  $\widetilde{T}_K = (I - P_k H) \widetilde{T}_{K-1}$
end for

Fig. 4

LOW COMPLEXITY MMSE EQUALIZATION PROCESS AND EQUALIZER FOR DOING THE SAME

TECHNICAL FIELD

The invention relates to the field of wireless communications and more particularly to an equalization process achieving Minimum Mean Square Error (MMSE) estimation with reduced complexity.

BACKGROUND ART

The development of wireless communication equipments and the continuous increase of the speed of the connections calls for advanced equalization methods. Indeed, the performance of wireless receivers tends to be severely impacted by fast time-varying propagation channels causing interference as well as the interference signal coming from the other wireless equipments.

Considering, for instance, the general signal model $$r = Hs + v$$

With s being the desired signal sequence, H being the propagation convolution matrix and v being the additive white Gaussian noise.

One known reference equalization method providing near-optimum performance is the well known Minimum Mean Square Error (MMSE) complying with the following—also well known—formulas:

$$\hat{s}_{MMSE} = U^H r = (H^H H + \sigma_v^2 I)^{-1} H^H r$$

$$(H^H H + \sigma_v^2 I) \hat{s}_{MMSE} = H^H r$$

Where U corresponding to the equalization matrix;
$\sigma_v$ correspond to the variance of the noise;
I correspond to the Identity matrix Generally speaking, communications systems designers usually attempt to embody the MMSE receiver which clearly which is the nearly-optimal receiver and yields a more accurate estimation which shows to be a satisfactory trade-off between ICI equalization and noise enhancement.

However, the implementation of MMSE equalization requires, as recalled above, the inversion of a matrix $$(H^H H + \sigma_v^2 I)$$

Which inversion involves a condition number of the order of $K(H^H H)$, thus entailing a significant amount of processing resources as well as a also non negligible amount of storage for the implementation of the MMSE receiver.

In the particular case where the H matrix is full rank—which is a general situation in practice—a second well-known equalization model can be considered, which is the so-called Zero-forcing (ZF) having a first advantage of not requiring any knowledge of the noise and, above all, which allows the equalizer to be simplified as shown below:

$$\hat{s}_{ZF} = (H^H H)^{-1} H^H r \quad \hat{s}_{ZF} = H^{-1} r \text{ if H is full rank}$$

$$(H^H H) \hat{s}_{ZF} = H^H r \quad H \hat{s}_{ZF} = r$$

The formula above recalls that the ZF receiver only requires the inversion of matrix H, corresponding to a computation having a condition number of K(H) only, and certainly not $K(H^H H)$ which was the case for the conventional MMSE technique.

Indeed, the problem of approximating the inverse of H is inherently better conditioned than the one of inverting $H^H H$ by observing the relation of their respective condition numbers (CN):

$$K(H) < K(H^H H).$$

As it is well-known from the literature the smaller the CN, the faster an iterative algorithm will converge So far, there has been a dilemma residing in the choice between, on one hand, accuracy of the equalization technique (MMSE) and, on the other hand, the complexity of the algorithm to be considered for embodying the equalizer ($K(H^H H)$ or K(H)).

Document "LOW-COMPLEXITY TIME-DOMAIN ICI EQUALIZATION FOR OFDM COMMUNICATIONS OVER RAPIDLY VARYING CHANNELS" by Thomas Hrycak and Gerald Matz shows a first attempt to achieve MMSE time domain equalization for an OFDM system with relative reduced complexity. For that purpose, an iterative LSQR algorithm is being used, which shows some drawbacks in particular because of the high amount of storage being required for embodying the LSQR.

Therefore, there is a wish for more advanced receiver equalization techniques to mitigate the effect of the interference and noise, achieving MMSE equalization with reduced complexity, of the order of K(H) only.

SUMMARY OF THE INVENTION

It is an object of the present invention to provide a new process achieving MMSE equalization with limited complexity.

It is another object of the present invention to provide a new category of reduced complexity fast-converging iterative equalization algorithms yielding nearly-optimal performance with respect to the conventional methods.

It is another object of the present invention to provide an iterative technique of MMSE equalization which requires computation techniques involving a condition number of the order of K(H) only in contrary to conventional MMSE equalization techniques.

It is a further object of the present invention to provide an iterative process for MMSE estimation which is applicable to a wide range of applications and standards, including OFDM, CDMA, GSM etc...

It is still another object of the present invention to provide a fast converging iterative equalization algorithm having reduced complexity which yields to near optimal performance.

These and other objects of the invention are achieved by means of a process for equalizing a signal received in a receiver of a Terminal Equipment in a wireless communication system, said process comprises the steps of:

receiving a signal r
applying an iterative algorithm based on a sequence of varying preconditioners in accordance with the following formula:

$$\hat{s}_{MMSE} = \left( \left( \sum_{k=1}^{K-1} \prod_{j=1}^{k} (I - P_j H) \right) + I \right) P_0 r$$

Based on a sequence of preconditioning matrices $P_j$, each matrix depending on H, the variance of the noise, and the precedent matrices $P_j$ within said sequence The preconditioning matrix Pk is determined as follows:

$$[P_K]_{i=n; j=1, \ldots, N} == 1_n(\sigma_s^2 \tilde{T}_{K-1} + \sigma_z^2(\tilde{T}_{K-1} - I)R^{-1})$$
$$\tilde{T}_{K-1}^H H^H S_n^H \cdot \cdot [S_n(H\tilde{T}_{K-1}(\sigma_s^2 I + \sigma_z^2 R^{-1})\tilde{T}_{K-1}^H H^H)S_n^H]^{-1} S_n$$

where $S_n$ is a $L_{FIR} \times P \times N$ selection matrix obtained by extracting a predetermined number ($L_{FIR}$) of rows (note $L_{FIR}$ corresponding to the estimated length of the channel) from the identity matrix $I_{PN}$;

I is the N×N identity matrix;

$\sigma_z^2$ is the variance of the noise;

$\sigma_s^2$ is the signal energy;

$1_n$ is being the 1×N vector containing 1 in n-th position and 0 elsewhere

In one embodiment, the iteration process is combined with the use of decoding block, e.g. a hard decision decoder or a soft decoder such as a viterbi or a turbocode decoder.

Preferably, the process is applied to a CDMA communication system or, alternatively, to an OFDM or even a GSM communication system.

The invention also achieves an equalizer for a telecommunications systems.

It is clear that the invention which was described above can implemented in any receiver of a wireless telecommunication system, and particularly the User Equipments (UE), such as the mobile phones, the Portable Document Assistants (PDA) etc. . . .

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

The equalization process which is described below shows the significant advantage of being applicable to a large number of wireless communication architectures and standards including, among others, the well known Orthogonal Frequency Division Multiplex (OFDM), the Code Division Multiplex Access (CDMA), the Global System for Mobile Telecommunications (GSM), High Speed Downlink Package Access (HSDPA) . . .

For the sake of clarity, the process will be described in relation to the simplest form of the signal model, ie summarized as follows:

$$r = Hs + v$$

Where s desired signal chip sequence (assumed i.i.d. with normalized energy)

H propagation channel convolution matrix v additive white Gaussian noise (modeling the inter-cell interference too) such that $v \sim N_c(0, \sigma_v^2 I)$ It will be apparent to a person skilled in the art that such system model is also applicable to Multiple In Multiple Out (MIMO) symmetrical architectures, which are based on different antennas for the transmission and the reception paths, and which can also be expressed under the above model.

Furthermore, one should notice that the general convolution matrix H can be considered to include any element of the communication chain between the sequence of data being transmitted and the signal being received in the receiver. This clearly includes the propagation channel, but also the antennas and even, in the particular case of OFDM, the FFT block involved into the receiver. More generally, any element of the transmitter or receiver chain may be included into the modelization matrix H and it will be only for the sake of clarity that latter will be designated, in the remaining part of the description, as being the "channel" matrix. It follows from what is preceding that the received signal can be considered as being, either a band base signal or the signal available at the antenna.

Generally speaking, one will now describe a process showing wide possibilities of applications since it achieves MMSE estimation by using techniques requiring a lower condition number (K(H)) with respect to the conventional MMSE technique based on the inversion of $H^H H$ and involving a condition number of $K(H^H H)$).

Consequently, significant resources can thus be saved even in the case of the embodiment of a MMSE estimation.

Furthermore, at it will be apparent to a person skilled in the art, the process which is provided below achieves fast convergence and requires limited number of iterations to achieve an accurate estimation of the MMSE signal.

Indeed, the inventors have discovered that the known Constant Preconditioned Iterative Technique (CPIT) (I) which has been, so far, conventionally used for inverting a channel matrix in the known ZF equalization method, can be advantageously and surprisingly modified in order to achieve a new process of Varying Preconditioning iterative technique (II) with the following two significant advantages:

a condition number K(H);

a convergence towards the MMSE equalization.

I. The Constant Preconditioned Iterative technique (CPIT) for ZF Equalization

The constant preconditioned iterative technique for ZF equalization is conventional and should normally not require any further introduction for a skilled man. However, for the sake of clarity and also because some common elements are shared with the new process which will be described in detail in (II), some additional information is provided.

As recalled above in the prior art section, the ZF technique requires the inversion of the matrix H and many techniques are known for performing such inversion.

$$\hat{s}_{ZF} = H^{-1} r$$

The inversion process of the matrix can be made faster by means of an appropriate preconditioning has been widely generalized so far.

Preconditioning has revealed to be an advantageous technique for speeding up the convergence of an iterative technique and thus improves iterative interference cancellation and signal detection by reducing the CN of the linear system to be solved and allow for faster convergence. For this purpose, the linear system $$\hat{s}_{ZF} = (PH)^{-1} Pr$$

is shown to be equivalent to the equation above.

General information on the preconditioning can be found in the document "*Templates for the Solution of Linear Systems: Building Blocks for Iterative Methods*" by Richard Barret et al. 2nd edition of the Templates book, which is available for purchase from the Society for Industrial and Applied Mathematics (http://www.siam.org/books).

The matrix inversion carried out in the ZF algorithm can be approximated by by a preconditioned iterative ZF receiver which computes the following iterations:

$$\hat{s} : ZF \approx \left( \sum_{k=0}^{K-1} (I - PH)^k \right) Pr$$

The equality being reached when K tends towards infinite.

If and only if $\rho(I-PH)<1$ and where P is a suitable non singular preconditioning matrix such that $K(H) \geq K(PH) \geq 1$. In the particular case where $P^{-1}=H$, the accurate inversion is obtained in one single iteration.

As known by the skilled man, the asymptotic convergence of the receiver above to the ZF solution is independent on the choice of the preconditioning matrix P.

Therefore, with the use of the convention preconditioning matrix, the iterative algorithm above always converges towards the ZF solution.

However, it has been discovered by the inventors that, under certain conditions, one may deviate from the ZF convergence and achieve real MMSE equalization without significantly increasing the complexity of the algorithm.

II. The Varying Preconditioning Iterative Technique (VPIT) for MMSE Algorithm

The CPIT algorithm which was recalled above is based on a constant preconditioning over iterations.

It is now proposed to supersede, in the conventional ZF preconditioned iterative algorithm, a variable preconditioning matrix so as to embody a Varying Preconditioning Iterative Technique (VPIT) which significantly improves the equalization since, under some conditions, it converges towards the MMSE solution.

This is achieved by using an iterative algorithm based on the use of a sequence of preconditioning matrixes $P_j$ in the formula below:

$$\hat{s}_{MMSE} \approx \left( \left( \sum_{k=1}^{K-1} \prod_{j=1}^{k} (I - P_j H) \right) + I \right) P_0 r$$

where the preconditioning matrix $P_j$ is not constant over the iterations but, on the contrary, is determined along the K iterations to give the set $\{P_0, P_1, P_2, \ldots P_{K-1}\}$. The equality being reached when K tends towards infinite.

One can define $$\tilde{G} = \prod_{k=0}^{K} \tilde{G}_k = \prod_{k=0}^{K} (I - P_k H)$$

Then, by denoting $$\tilde{T}_{K-1} = \Pi_{k=0}^{K-1} \tilde{G}_k:$$

The error of the VPIT receiver of the (K-1)-th order can be expressed as follows:

$$\tilde{s} = \tilde{G}(s + H^{-1} z) - H^{-1} z = = \tilde{G}_K \tilde{T}_{K-1} s + (\tilde{G}_K \tilde{T}_{K-1} - I) H^{-1} z$$

And its Means Square Error (MSE) as:

$$E\|\tilde{s}\|^2 = tr\{\sigma_s^2 \tilde{G}_K \tilde{T}_{K-1} \tilde{T}_{K-1}^H \tilde{G}_K^H\} + tr\{\sigma_z^2 (\tilde{G}_K \tilde{T}_{K-1} - I) R^{-1} (\tilde{G}_K \tilde{T}_{K-1} - I)^H\}$$

Where $R = H^H H$

Figure 1:
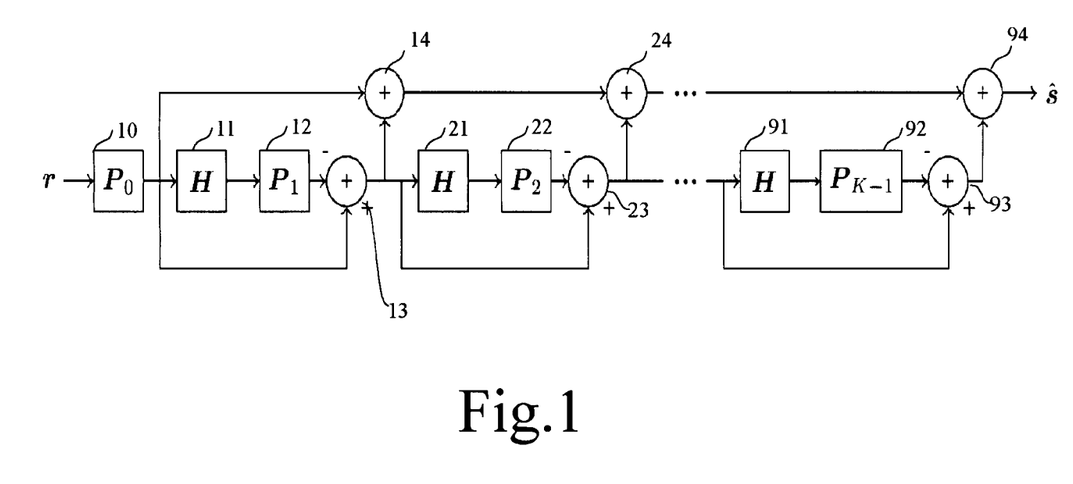
FIG. 1 illustrates the block diagram of a first embodiment of a MMSE receiver based on a Varying Preconditioning Iterative Technique (VPIT) equalizer.

It can be seen that the formula above can be embodied by means of an iterative process, which process is illustrated in the block diagram of FIG. 1 illustrating three iterations steps corresponding to K=1, 2 and . . . K−1.

One sees that the received signal is entered into the input of a block 10 corresponding to the first preconditioning matrix $P_0$, so as to compute the first element $P_0 r$. The output of block 10 is forwarded to a first input of a first adder 14, to the positive input of a substractor 13 and also to the input of a functional block 11 embodying the channel matrix H, the output of which being connected to the input of a block 12 embodying preconditioning matrix $P_1$ being different from $P_0$. The output of block 12 is forwarded to the inverting input of substractor 13, the output of which carrying the result of the first iteration.

The second iteration is based on a similar arrangement of blocks 21, 22, 23 and 24 which respectively correspond to channel H, to the second preconditioning matrix $P_2$, to a second substractor 23 and to a second adder 24. One sees again that, similarly as for the first iteration, the output of substractor 13 is forwarded to the second input of adder 14, to the positive input of substractor 23 and also to the input of a functional block 21 embodying again the channel matrix H, the output of which being connected to the input of a block 22 embodying preconditioning matrix $P_2$ being different from $P_0$ and $P_1$. The output of block 22 is forwarded to the inverting input of substractor 23, the output of which thus yielding the result of the second iteration.

Additional iterations may be considered and will correspond to counterpart functional blocks. The last iteration which is represented in FIG. 1, is based on functional block 91 (H), functional block 92 ($P_{K-1}$), substractor 93 and adder 94 which will not be further developed.

It should be noticed that the functional diagram of FIG. 1 can be adapted in accordance with the particular requirements of the receiver to be carried out. In particular, the skilled man can advantageously combine the use of the sequence of preconditioning with appropriate decoding blocks, such as decoding blocks 15, 20, 30 and 40 illustrated in FIG. 2, which are respectfully inserted downward blocks 10, 13, 23 and . . . Block 93. The other elements common with those of FIG. 1 carrying the same reference than in FIG. 1.

Figure 2:
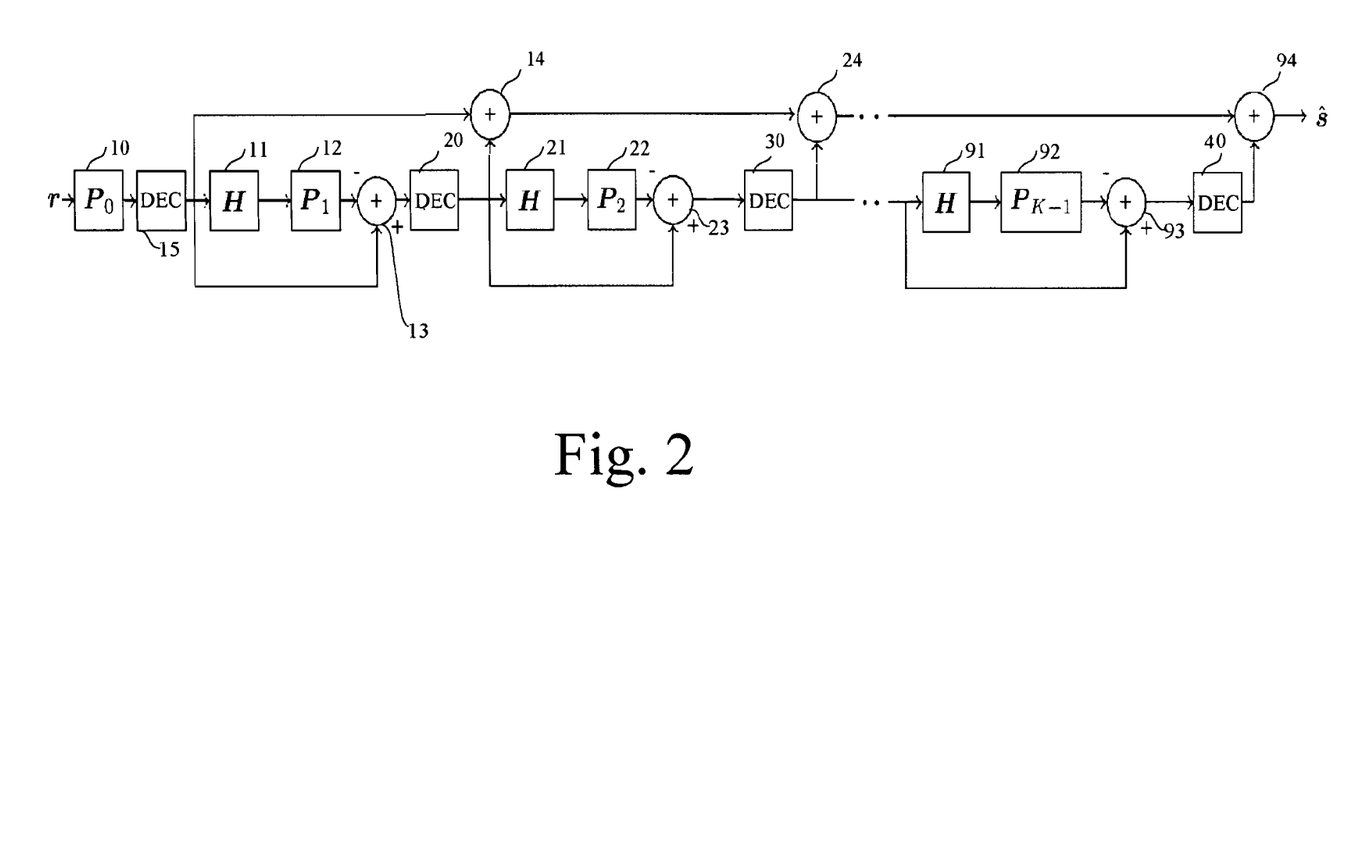
FIG. 2 illustrates a second embodiment of a MMSE receiver combining Varying Preconditioning Iterative Technique (VPIT) equalizer with decoder.

In one embodiment, the decoder 15 (resp. decoder 20) may be a hard decoder or a soft decoder such as, for instance a viterbi decoder or a turbo code decoder. The use of such decoders is well known to a skilled man and will not be further developed. In one particular embodiment, according to the requirements, the skilled man may combine such decoders with appropriate functional blocks , such as, for instance and without any limitation, re-encoders.

The use of a decoder within the architecture can significantly improve the efficiency of the receiver.

With respect to FIG. 2, there is now described one embodiment of a process for achieving a VPIT converging towards the MMSE solution.

Figure 3:
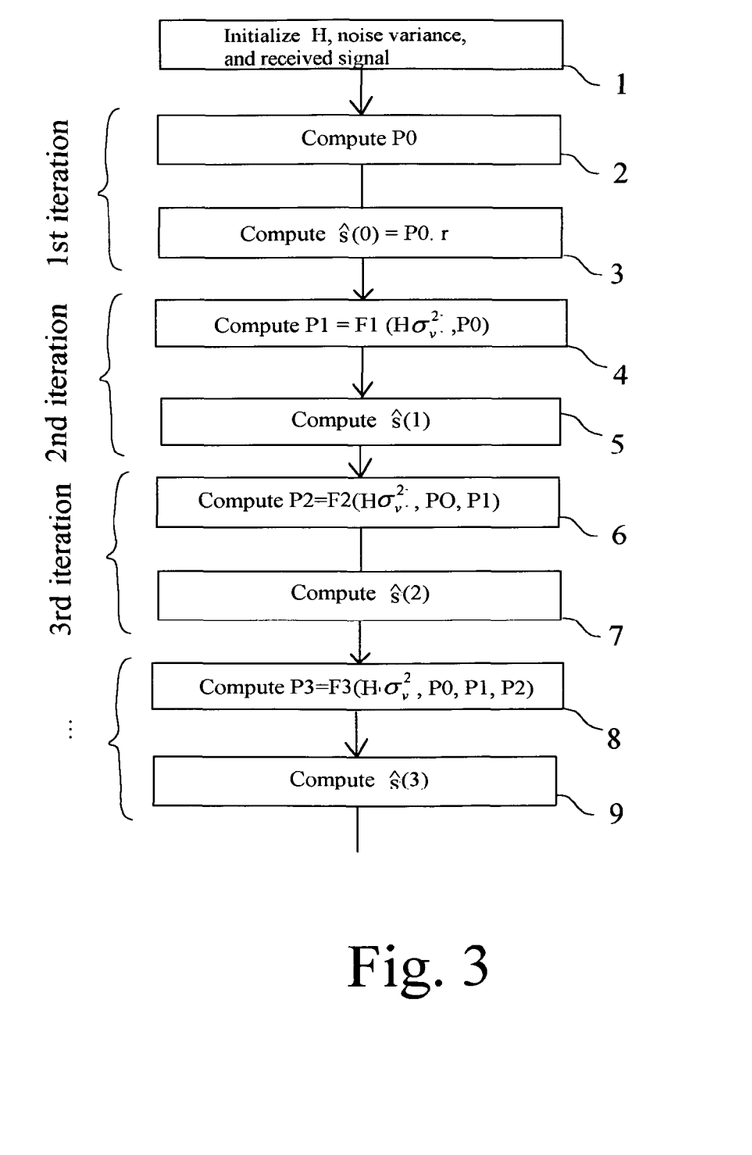
FIG. 3 illustrates one embodiment of an iterative MMSE process using VPIT.
Figure 4:
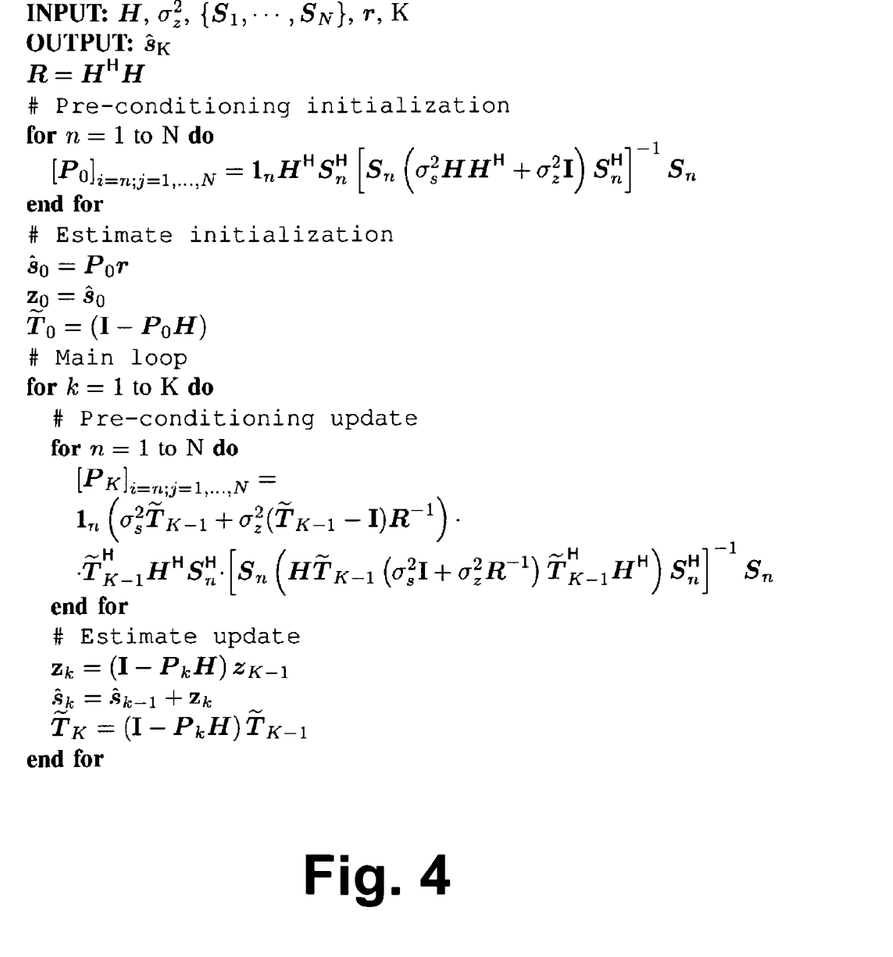
FIG. 4 illustrates one particular practical embodiment of the MMSE algorithm based on the use of varying preconditioning iterating technique.

In a step 1, the process is initialized with the knowledge of the three following parameters:
the propagation channel matrix H;
the noise variance $\sigma_v^2$
the received signal r It should be noticed that the determination of the channel H and the noise can be performed by conventional techniques, such as by means of the use of conventional pilot or reference signals, which are not part of the present invention and will, therefore, not be further developed.

In a step 2, the process proceeds with the first iteration of the MMSE estimation by computing a first preconditioned matrix $P_0$ which is defined as a function $f_0$ of H and $\sigma_v^2$ Then, in a step 3, the process proceeds with the computation of the first iteration of the MMSE estimation as follows:

$$S^\wedge(0) = P_0 \cdot r$$

Then, in a step 4, the process proceeds with a next iteration, starting with the calculation of the next preconditioning matrix P1 which is computed as a function $f_1$ of H, $\sigma_v^2$ as well as $P_0$.

Then, in a step 5, the process proceeds with the computation of the second iteration, that is:

$$S^\wedge(1) = S^\wedge(0) + (I - P_1 H) P_0 r$$

The second iteration then completes and the process then proceeds to a step 6 which is the start of the third iteration, wherein the second preconditioning matrix $P_2$ is being computed as a function f2 of H, $\sigma_v^2$, $P_0$ and $P_1$.

Then, in a step 7, the process proceeds with the computation of $$S^\wedge(2) = S^\wedge(1) + (I - P_2 H) S^\wedge(1)$$
$$= S^\wedge(0) + S^\wedge(1) + (I - P_2 H)(I - P_1 H) P_0 H r$$

The process may then possibly reiterate the sequence of steps 2-3, 4-5, 6-7 in order to converge more towards the MMSE solution, and FIG. 3 illustrates steps 8 and 9 which respectively correspond to the computation of the third preconditioning matrix P3 being a function f3 of H, $\sigma_v^2$, $P_0$ $P_1$ and $P_2$, and then is the computation of $S^\wedge(3)$.

In one embodiment, the process uses three basic iterations which have shown to provide satisfactory results but, clearly, this is only an example and one may consider any number of iterations for the purpose of reaching the level of accuracy being required.

It should be noticed, however, that the use of the sequence of preconditioning matrices achieves a fast converging process, particularly with the examples described below.

III. Determination of the Optimal Sequence of VPIT Matrixes $P_K$

The optimal preconditioning matrix $P_K$ for the K-th iteration can be determined by minimizing the MSE above.

$$P_K = \arg\min_{P_K \in \mathcal{P}_K} E\|\tilde{s}_K\|^2$$
$$= (\sigma_s^2 \tilde{T}_{K-1} + \sigma_z^2(\tilde{T}_{K-1} - I) R^{-1}) \tilde{T}_{K-1}^H H^H$$

-continued
$$(H \tilde{T}_{K-1} (\sigma_s^2 I + \sigma_z^2 R^{-1}) \tilde{T}_{K-1}^H H^H)^{-1}$$

In one embodiment, the complexity is significantly reduced by means of a sparsing exploiting the band structure of the channel matrix. The propagation channel sparseness structure has shown to be particularly relevant in the case of W-CDMA.

More particularly, the following optimal constrained MMSE preconditioning matrix for the K+1 iteration step is proposed, given the set $\{P_0, P_1 \ldots P_{K-1}\}$ and the $S_n$, as follows:

$$[P_K]_{i=n; j=1, \ldots, N} = 1_n (\sigma_s^2 \tilde{T}_{K-1} + \sigma_z^2 (\tilde{T}_{K-1} - I) R^{-1})$$
$$\tilde{T}_{K-1}^H H^H S_n^H \cdot [S_n (H \tilde{T}_{K-1} (\sigma_s^2 I + \sigma_z^2 R^{-1}) \tilde{T}_{K-1}^H H^H) S_n^H]^{-1} S_n$$

Where
$S_n$ is a $L_{FIR} \times P \times N$ selection matrix obtained by extracting a predetermined number ($L_{FIR}$) of rows (note $L_{FIR}$ corresponding to the estimated length of the channel) from the identity matrix $I_{PN}$;
I is the N×N identity matrix;
$\sigma_z^2$ is the variance of the noise;
$\sigma_s^2$ is the signal energy;
$1_n$ is being the 1×N vector containing 1 in n-th position and 0 elsewhere The preconditioning matrix $P_K$ allows a significant sparsing because of the use of the selection matrix $S_n$. This strongly reduces the complexity of the algorithm and thus limits the need of huge digital signal processing resources in the receiver.

FIG. 5 illustrates one particular embodiment of an algorithm which provides effective MMSE estimation with reduced level of complexity.

The algorithm starts with the knowledge of H, $\sigma_z^2$, $\{S_1, \ldots, S_N\}$, r, K
Then the algorithm enters into an initialization loop:
for n=1 to N do $$[P_0]_{i=n; j=1, \ldots, N} = 1_n H^H S_n^H [S_n (\sigma_s^2 HH^H + \sigma_z^2 I) S_n^H]^{-1} S_n$$

end for
The initialization of the estimate is then carried out:

$$\hat{s}_0 = P_0 r$$
$$z_0 = \hat{s}_0$$
$$\tilde{T}_0 = (I - P_0 H)$$

The algorithm then proceeds with the main loop (for k=1 to K) which comprises parts:
A pre-conditioning update:
for n=1 to N do $$[P_K]_{i=n; j=1, \ldots, N} = 1_n (\sigma_s^2 \tilde{T}_{K-1} + \sigma_z^2 (\tilde{T}_{K-1} - I) R^{-1}) \cdot \tilde{T}_{K-1}^H H^H S_n^H \cdot [S_n (H \tilde{T}_{K-1} (\sigma_s^2 I + \sigma_z^2 R^{-1}) \tilde{T}_{K-1}^H H^H) S_n^H]^{-1} S_n$$

end for
And an estimate update:

$$z_k = (I - P_k H) z_{k-1}$$
$$\hat{s}_k = \hat{s}_{k-1} + z_k$$
$$\tilde{T}_K = (I - P_k H) \tilde{T}_{K-1}$$

By limiting the complexity and determining preconditioning coefficients in accordance with the technique above, it becomes possible to reduce the computational requirements at the expense of an increased number of iterations depending on the target performance.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or another programmable data processing apparatus to cause a series of operational steps To be performed on the computer or other programmable apparatus to produce a computer implemented process such that the instructions which execute on the computer or the other programmable apparatus provide steps for implementing the functions specified in the flowchart block or blocks.

Accordingly, blocks of the flowchart illustrations support combinations of means for performing the specified functions, combinations of steps for performing the specified functions and program instruction means performing the specified functions. It will also be understood that each block of the flowchart illustrations, and combinations of blocks in the flowchart illustrations, can be implemented by special purpose hardware or computer systems which perform the specified functions or steos, or combinations of special purpose hardware and computer instructions.

The invention claimed is:

1. A method for equalizing a signal received in a receiver of a Terminal Equipment in a wireless communication system, comprising:
receiving a signal r at the Terminal Equipment;
applying an iterative algorithm to the received signal r to determine a Minimum Mean Square Error (MMSE) equalized signal $\hat{s}_{MMSE}$, the iterative algorithm being based on a sequence of varying preconditioning matrices $P_j$ in accordance with the following formula:

$$\hat{s}_{MMSE} \approx \left(\left(\sum_{k=1}^{K}\sum_{j=1}^{k}(I-P_jH)\right)+I\right)P_0 r$$

wherein each preconditioning matrix $P_j$ in the sequence, other than initial preconditioning matrix $P_0$ and a final preconditioning matrix $P_K$ is determined based on a propagation channel convolution matrix H, the variance of the noise in the channel, and the precedent matrices $P_j$ within said sequence.

2. The method of claim 1, further comprising:
determining the final and optimal preconditioning matrix $P_K$ for a Kth iteration of the algorithm based on a set of the preceding preconditioning matrices $\{P_0, P_1, \ldots P_{K-1}\}$ as follows:

$$[P_K]_{i=n;j=1,\ldots,N}==1_n(\sigma_s^2\tilde{T}_{K-1}+\sigma_z^2(\tilde{T}_{K-1}-I)R^{-1})$$
$$\tilde{T}_{K-1}^H H^H S_n^H \cdot \cdot [S_n(H\tilde{T}_{K-1}(\sigma_s^2 I+\sigma_z^2 R^{-1})\tilde{T}_{K-1}^H H^H)S_n^H]^{-1} S_n$$

wherein:
$S_n$ is a $L_{FIR} \times P \times N$ selection matrix obtained by extracting a predetermined number ($L_{FIR}$) of rows (note $L_{FIR}$ corresponding to the estimated length of the channel) from the identity matrix $I_{PN}$;
I is an N×N identity matrix;
$\sigma_z^2$ is the variance of the noise in the channel;
$\sigma_s^2$ is a signal energy;
$1_n$ is a 1×N vector containing 1 in n-th position and 0 elsewhere;
and wherein:

$$R=H^H H$$

$$\tilde{T}_{K-1}=\Pi_{k=0}^{K-1}\tilde{G}_k;$$

is defined with:

$$\tilde{G}=\prod_{k=0}^{K}\tilde{G}_k=\prod_{k=0}^{K}(I-P_kH).$$

3. The method of claim 1, wherein said iteration process is combined with the use of one of the following decoding blocks: a hard decision decoder, a viterbi soft decoder or a turbocode soft decoder.

4. The method of claim 1, wherein said communication system is a CDMA (Code Division Multiple Access) communication system.

5. The method of claim 1, wherein said communication system is an OFDM (Orthogonal Frequency Division Multiplex) communication system.

6. The method of claim 1, wherein said communication system is a GSM (Global System for Mobile Telecommunications) communication system.

7. An equalizer for a receiver of a User Equipment (UE) of a wireless communication system, the equalizer being configured to:
receive a signal r;
apply an iterative algorithm to the received signal r to determine a Minimum Mean Square Error (MMSE) equalized signal $\hat{s}_{MMSE}$, the iterative algorithm being based on a sequence of varying preconditioning matrices $P_j$ in accordance with the following formula:

$$\hat{s}_{MMSE} \approx \left( \left( \sum_{k=1}^{K} \sum_{j=1}^{k} (I - P_j H) \right) + I \right) P_0 r$$

wherein each preconditioning matrix $P_j$ in the sequence, other than initial preconditioning matrix $P_0$ and a final preconditioning matrix $P_K$ is determined based on a propagation channel convolution matrix H, the variance of the noise in the channel, and the precedent matrices $P_j$ within said sequence.

8. The equalizer of claim 7, wherein the equalizer is further configured to:
determine the final and optimal preconditioning matrix $P_K$ for a Kth iteration of the algorithm based on a set of the preceding preconditioning matrices $\{P_0, P_1, \ldots P_{K-1}\}$ as follows:

$$[P_K]_{i=n; j=1, \ldots, N} == 1_n(\sigma_s^2 \tilde{T}_{K-1} + \sigma_z^2 (\tilde{T}_{K-1} - I) R^{-1})$$
$$\tilde{T}_{K-1}^H H^H S_n^H \cdot \cdot [S_n (H \tilde{T}_{K-1} (\sigma_s^2 I + \sigma_z^2 R^{-1}) \tilde{T}_{K-1}^H H^H) S_n^H]^{-1} S_n$$

wherein:
$S_n$ is a $L_{FIR} \times P \times N$ selection matrix obtained by extracting a predetermined number ($L_{FIR}$) of rows (note $L_{FIR}$ corresponding to the estimated length of the channel) from the identity matrix $I_{PN}$;
I is an N×N identity matrix;
$\sigma_z^2$ is the variance of the noise in the channel;
$\sigma_s^2$ is a signal energy;
$1_n$ is being the 1×N vector containing 1 in n-th position and 0 elsewhere;
and wherein:
$R = H^H H$ $\tilde{T}_{K-1} = \Pi_{k=0}^{K-1} \tilde{G}_k$,
is defined with:

$$\tilde{G} = \prod_{k=0}^{K} \tilde{G}_k = \prod_{k=0}^{K} (I - P_k H).$$

9. The equalizer of claim 7, wherein said equalizer is configured to utilize at least one of the following decoding blocks in its iterative algorithm: a hard decision decoder, a viterbi soft decoder or a turbocode soft decoder.

10. The equalizer of claim 7, wherein said communication system is a CDMA (Code Division Multiple Access) communication system.

11. The equalizer of claim 7, wherein said communication system is a OFDM (Orthogonal Frequency Division Multiplex) communication system.

12. The equalizer of claim 7, wherein said communication system is a GSM (Global System for Mobile Telecommunications) communication system.

13. The equalizer of claim 7, wherein said communication system is a symmetric MIMO (Multiple In Multiple Out) communication system.

14. The equalizer of claim 7, wherein the equalizer is included in a mobile telephone.

15. A computer program product stored in a non-transitory computer-readable medium, said computer program product comprising program instructions for equalizing a received signal, the computer program product comprising computer program code which, when run on an wireless terminal, configures the wireless terminal to:
receive a signal r;
apply an iterative algorithm to the received signal r to determine a Minimum Mean Square Error (MMSE) equalized signal $\hat{s}_{MMSE}$, the iterative algorithm being based on a sequence of varying preconditioning matrices $P_j$ in accordance with the following formula:

$$\hat{s}_{MMSE} \approx \left( \left( \sum_{k=1}^{K} \sum_{j=1}^{k} (I - P_j H) \right) + I \right) P_0 r$$

wherein each preconditioning matrix $P_j$ in the sequence, other than initial preconditioning matrix $P_0$ and a final preconditioning matrix $P_K$ is determined based on a propagation channel convolution matrix H, the variance of the noise in the channel, and the precedent matrices $P_j$ within said sequence.

\* \* \* \* \*